(12) United States Patent
Zancan et al.

(10) Patent No.: US 6,879,598 B2
(45) Date of Patent: Apr. 12, 2005

(54) FLEXIBLE MEDIA ACCESS CONTROL ARCHITECTURE

(75) Inventors: Mario Zancan, Chippenham (GB); Victoria A. Griffiths, Beth (GB); Clement Lee, Portland, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 111 days.

(21) Appl. No.: 10/459,091

(22) Filed: Jun. 11, 2003

(65) Prior Publication Data

US 2004/0252705 A1 Dec. 16, 2004

(51) Int. Cl.[7] .............................................. H04L 12/66
(52) U.S. Cl. ...................................... 370/463; 370/469
(58) Field of Search ................................ 370/463, 469, 370/465, 466; 709/230; 710/11

(56) References Cited

U.S. PATENT DOCUMENTS 6,069,897 A * 5/2000 Perlman et al. ............. 370/420
6,366,557 B1 * 4/2002 Hunter ....................... 370/217
2003/0067928 A1 * 4/2003 Gonda ........................ 370/401
2004/0013102 A1 * 1/2004 Fong et al. ................. 370/345

OTHER PUBLICATIONS

"Microprogrammed State Machine Design" by Michel Lynch, CRC Press, 1993, pp. 100–109.

* cited by examiner

*Primary Examiner*—Ajit Patel
(74) *Attorney, Agent, or Firm*—MacPherson Kwok Chen & Heid LLP; Jon W. Hallman

(57) ABSTRACT

A media access control processor includes a receiver co-processor and a transmitter co-processor. Each co-processor includes its own micro-controller. Depending upon the desired communication protocol being implemented, a programmable logic device controls the loading of an appropriate set of micro-instructions into the micro-controller's memory.

24 Claims, 4 Drawing Sheets

FLEXIBLE MEDIA ACCESS CONTROL ARCHITECTURE

TECHNICAL FIELD

The present invention relates generally to network processing, and more particularly to a receiver and transmitter architecture providing the flexibility to perform media access control processing according to a variety I/O standards.

BACKGROUND

Communication protocol layering breaks down the complexity of modern communications into smaller, more convenient pieces. For example, the Open System Interconnect (OSI) reference model includes, at its lowest levels, a physical layer and a data link layer. The physical layer is the lowest level and specifies the bit-level coding and synchronization scheme such that bits may be transferred between users on a network. As is the case with all the remaining layers, the physical layer specification is simply a protocol or rule set and is silent with respect to specific implementations a user may desire. Thus, communication protocol layering allows a user to make implementation changes in one layer without affecting the remaining layers.

Above the physical layer is the data link layer, which specifies, among other matters, how a user accesses the communication medium and related framing, error correction, and addressing issues. The particular set of rules within the data link layer associated with accessing the medium are denoted as the media access control (MAC) sublayer. Without such a layer, a user would not be able to, for example, distinguish idle transmissions from data-containing transmissions. In general, the data link layer will be strongly influenced by the actual transmission medium being used. Thus, the MAC sublayer must be changed depending upon the transmission medium and the communication protocol being supported.

Two approaches are conventionally used to implement the MAC sublayer. In a dedicated approach, each communication protocol being supported requires its own MAC sublayer hardware. For example, each station in a one gigabit Ethernet network may have an application-specific integrated circuit (ASIC) dedicated to performing the appropriate MAC sublayer. Should the network also support a 10 gigabit Ethernet protocol, each station would need another ASIC to support the corresponding MAC sublayer.
Alternatively, a software-implemented approach may be used. In such a technique, a processor loaded with the appropriate software implements the MAC layer.

Each of the above-described approaches suffers from certain disadvantages. Although a dedicated hardware approach offers relatively fast processing speeds, each communication protocols being supported demands more die area since it most have its own MAC sublayer ASIC. Although a software-implemented approach does not require additional die area for each protocol being supported, it suffers from relatively lower processing speed. Thus, a user desiring a system which supports multiple communication protocols is faced with a quandary: choose dedicated MAC sublayer hardware for each protocol to get better processing speed but suffer from increased die space demands or use a processor to implement the necessary MAC sublayers but suffer from lower processing speed.

Accordingly, there is a need in the art for improved techniques to implement the MAC sublayer in communication systems supporting multiple communication protocols.

SUMMARY

One aspect of the invention relates to a media access control (MAC) processor having a receiver configured to generate conditions based upon data and control words received from a physical layer source. A micro-controller controls the receiver based upon the conditions, the micro-controller including a memory storing micro-instructions, the micro-controller being configured to execute a micro-instruction from the memory responsive to the conditions and a previously-executed micro-instruction, the receiver being configured to, responsive to the micro-instruction being executed, generate an output for a network layer based upon the received data and control words.

Another aspect of the invention relates to a media access control (MAC) processor having a transmitter configured to generate conditions based upon a received data packet from a network layer source. The transmitter includes a micro-controller having a memory storing micro-instructions; the micro-controller being configured to execute a micro-instruction from the memory responsive both to the conditions and a previously-executed micro-instruction, the transmitter being configured to, responsive to the micro-instruction being executed, generate a framed data packet and an associated control word for a physical layer subcoding processor based upon the received data packet.

Another aspect of the invention relates to a method of MAC sublayer processing. In a first act of this method, a micro-controller is provided that is configured to control the MAC sublayer processing of network layer data packets according to executed micro-instructions retrieved from a micro-program memory. The method also includes acts of selecting a communication protocol from a set of potential communication protocols for the network layer data packets; loading a set of micro-instructions into micro-program memory, wherein the set of micro-instructions are chosen according to the selected communication protocol; and executing the loaded micro-instructions to MAC sublayer process the network layer data packets according to the selected communication protocol.

BRIEF DESCRIPTION OF THE DRAWINGS

Use of the same reference symbols in different figures indicates similar or identical items.

DETAILED DESCRIPTION

The present invention provides an architecture focused on MAC-sublayer functionality that provides the flexibility of supporting the MAC sublayer for multiple communication protocols without requiring an ASIC for each protocol and without suffering the reduced processing speed encountered in a software-implemented approach.

Figure 1:
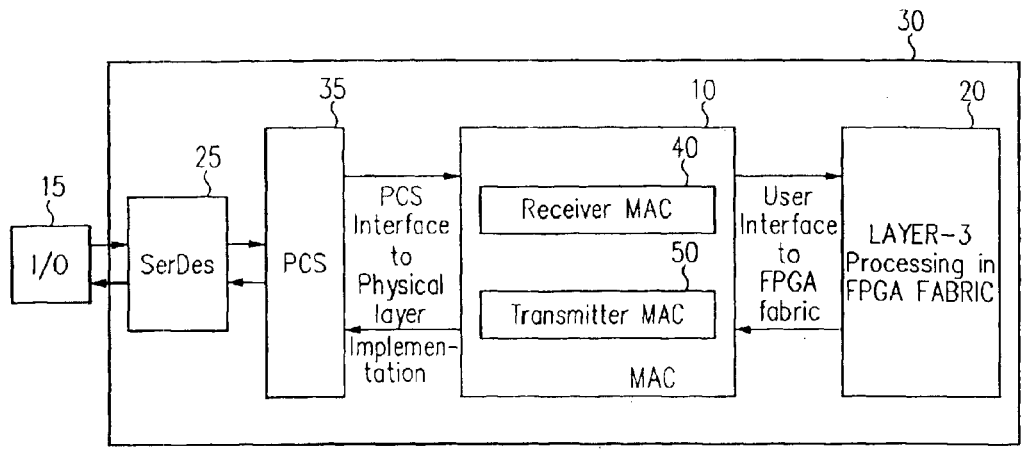
FIG. 1 is a block diagram of a MAC processor embedded in an FPGA according to one embodiment of the invention.

Turning now to FIG. 1, a MAC processor 10 is shown being implemented between a serial source 15 and a programmable core fabric 20 of programmable logic device such as a field programmable gate array (FPGA) 30. Serial data from serial source 15 is de-serialized at a SERDES 25 and processed through a physical layer processor 35 providing physical layer subcoding (PCS) to provide a parallel data packet to MAC processor 10. MAC processor 10 includes a receiver co-processor 40 and a transmitter co-processor 50. Receiver co-processor 40 receives the parallel data packet from physical layer processor 35 and checks its consistency with data link layer receive and decoding rules. If the packet is good, receiver co-processor 40 transmits the packet to a network layer implemented in core fabric 20. Similarly, the network layer implemented in core fabric 20 may provide network-level packets to transmitter co-processor 50, which encapsulates the network-level packets into the required format and forwards the formatted packet to the physical layer processor 35.

As will be explained further herein, each co-processor 40 and 50 includes a dedicated micro-controller and a cyclic redundancy code (CRC) co-processor. To provide a modular construction, the dedicated micro-controller for each co-processor 40 and 50 may have the same architecture. Each dedicated micro-controller governs the behavior of the various co-processors and determines the order of execution. Each micro-controller's memory is initialized with a set of micro-instructions that dictate the operation of the respective receiver co-processor 40 and transmitter co-processor 50 during normal operation. The micro-instructions are chosen to implement a desired MAC sublayer finite state machine processing. For example, a finite state machine for a PCI Express MAC sublayer may be implemented. Alternatively, by changing the set of micro-instructions, a finite state machine for a one Gigabit Ethernet (1GE) MAC sublayer may be implemented.

Regardless of what particular MAC sublayer is being implemented, the sequencing of the micro-instructions is determined by the current finite state machine state and external conditions. Because the desired MAC sublayer is implemented using mico-controllers driven by micro-instructions, the addition of features to support additional standard protocols does not imply redesign of an entire data link layer. Instead, the additional protocols may be supported by simply compiling additional microinstructions together with a few extensions to hardware co-processors if necessary.

Figure 2:
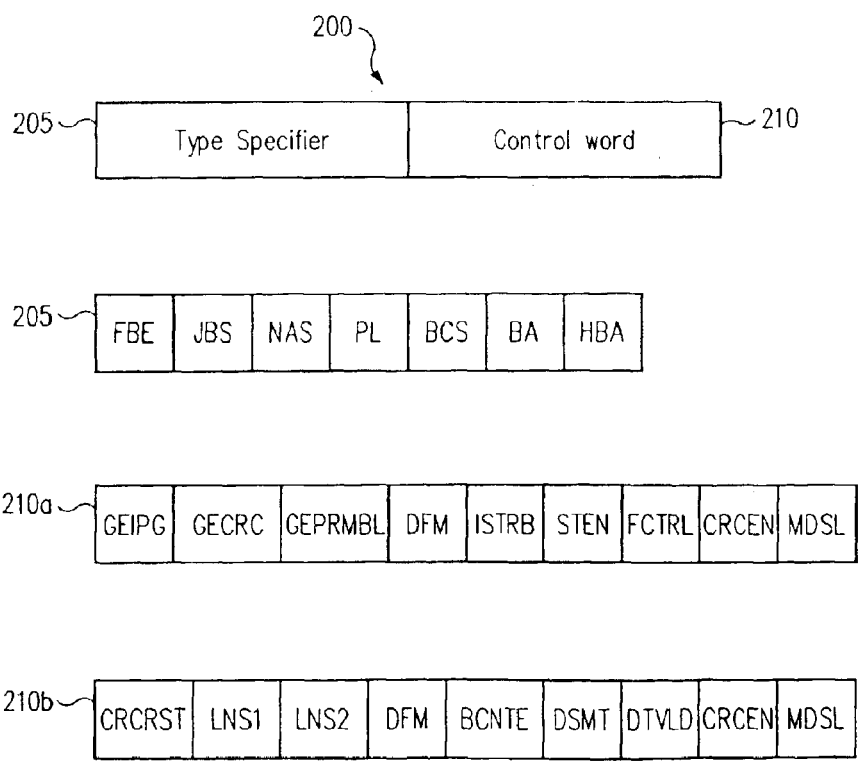
FIG. 2 is a graphical representation of a microinstruction and its possible type identifiers specifying what the next microinstruction will be and the possible control words according to one embodiment of the invention.

An example microinstruction format will now be described with reference to FIG. 2. Each microinstruction 200 includes a type specifier 205 indicating what the subsequent instruction type will be. An associated control word 210 is differentiated into transmission control words 210a and receiver control words 210b and will be discussed further herein in conjunction with further discussion of receiver co-processor 40 and transmitter co-processor 50. Type specifier 205 may have the following fields:

Four ways Branch Enable (FBE). FBE may be a single bit, which when enabled, indicates that four-ways branching is possible.

Jump or Branch Selector (JBS). JBS is a bit to distinguish between a Jump to Subroutine (JSR) and a Branch (BRN) microinstruction 200.

Next Address Selector (NAS). NAS selects the next microinstruction 200. For example, four types of microinstructions 200 may be utilized: Jump to Subroutine (JSR), Branch (BRN), Return to Subroutine (RTS), and Increment (INC). JSR and BRN take one argument, the target address destination, whereas RTS takes no argument. INC points to the next address/memory location.

Condition Enable (CNE). CNE is a bit field used to indicate whether conditional branching is enabled. Should conditional branching be enabled as controlled by CNE and the associated external condition be satisfied, a branch to the address specified by the BA field will occur.

Polarity Bit (PB). PB is a bit field used to indicate whether the external condition to be evaluated in a conditional branching evaluation should be true or false to enable the jump.

Branch Condition Select (BCS). BCS is a bit field identifying the external condition to be evaluated for a conditional branching evaluation.

Branch Address (BA). BA is the branch destination address.

High Tier Branch Address (HBA). HBA may be employed to give a priority mechanism for conditional branching. In other words, various branch addresses could be given different levels of priority.

It will be appreciated that the-above instruction set is merely exemplary and that other types of instruction sets may be implemented. For example, this instruction set is an example of horizontal microprogramming such that each microinstruction 200 is entirely unencoded and each control signal may be assigned to a different bit field in the microinstruction format. In this fashion, a micro-programming branching decision may be made in the same clock cycle using explicit next-address fields. However, it will be appreciated that vertical microprogramming techniques could also have been used in the present invention.

Figure 3:
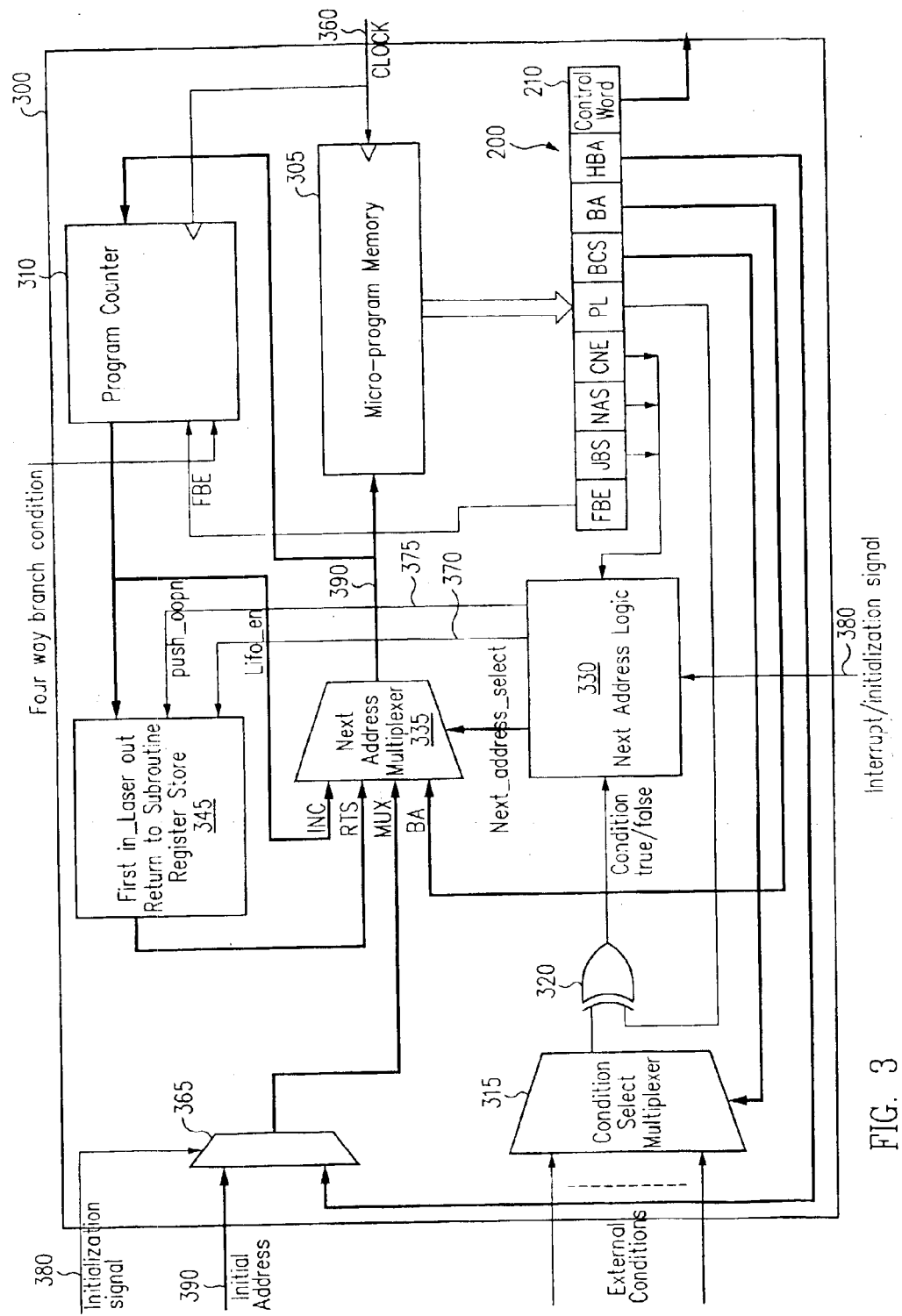
FIG. 3 is a block diagram of a micro-controller for controlling either the receiver or transmitter co-processor in the MAC processor of FIG. 1.

Turning now to FIG. 3, a microcontroller 300 is shown that is configurable to implement either of the necessary transceiver and receiver finite state machines for the MAC sublayers required for the desired communication protocols. For example, micro-controller 300 may be programmed for operation according to either a one Gigabit Ethernet (1GE), ten Gigabit Ethernet (10GE), or PCI Express (PCIE) protocol. Microcontroller 300 includes a micro-program memory 305 for storing the micro-instructions 200. For example, micro-program memory may store 32 micro-instructions 200, each micro-instruction 200 being 32 bits long. It will be appreciated, however, that the number of micro-instructions and their length is arbitrary and depends upon the particular MAC sublayers being implemented. Should no branching or jumping be enabled, the sequencing of micro-instructions 200 is triggered by a program counter 310. As is known in the art, program counter 310 points sequentially to address locations in micro-program memory 305 at each cycle of a clock 360. The micro-instruction 200 at the indicated address is then executed.

Micro-controller 300 receives external conditions through a condition select multiplexer 315. These conditions are determined by the data being processed as will be explained further herein. The BCS field in each executed microinstruction 200 controls the selection by condition select multiplexer 315. Whether the selected condition (as controlled by BCS) from condition select multiplexer 315 should be either true or false is controlled through XOR gate 320 as driven by the Polarity Bit (PB) from the executed micro-instruction 200. A next address logic block or instruction decoder 330 performs the necessary logic to control a next address multiplexer 335 based upon the output of XOR gate 320 and the JBS, NAS, and CNE field states. Should no branching or jumping be enabled, next address logic block 330 controls next address multiplexer 335 to select an increment signal (INC) from program counter 310. Program counter 310 points sequentially to address locations in micro-program memory 305 at each cycle of clock 360 through the INC signal. Next address multiplexer 335 also receives a MUX signal from a multiplexer 365, a return to subroutine (RTS) signal from a LIFO (last in, first out) register 345, and the BA field from the currently-executed micro-instruction 200. Because the Branch Address (BA) field is thus explicitly provided, the branch may occur on the next clock cycle. Program counter 310 provides the INC signal to LIFO register 345 so that a return address may be stored should a subroutine be called through a JSR micro-instruction 200 (as determined by NAS). Should a subroutine be called, next address logic block 330 may control LIFO register 345 to store the current INC signal through an enable signal 370 and a "push" signal 375. LIFO register 345 provides the return address to next address multiplexer 335 as the RTS signal. A code start address register (not illustrated) stores an initial starting address 390 for micro-program memory 305 when an initialization signal 380 is asserted. Initialization signal 380 would then command multiplexer 380 to select for initial starting address 390. In turn, initialization signal 380 would also control next address logic block 330 to command next address multiplexer 335 to select for the MUX signal. Note that if the initialization signal 380 is not asserted, multiplexer 365 will select for the HBA field from the executed micro-instruction 200.

Micro-program memory 305 receives an address output 390 of next address multiplexer 335 and retrieves the micro-instruction stored at this address. Thus, with respect to micro-program memory 305, address output 390 functions as the output of a micro-sequencer. The currently-executed micro-instruction 200 includes a control word 210 whose format differs depending upon whether micro-controller 300 is configured to control receiver co-processor 40 (control word 210b) or transmitter co-processor 50 (control word 210b).

Figure 4:
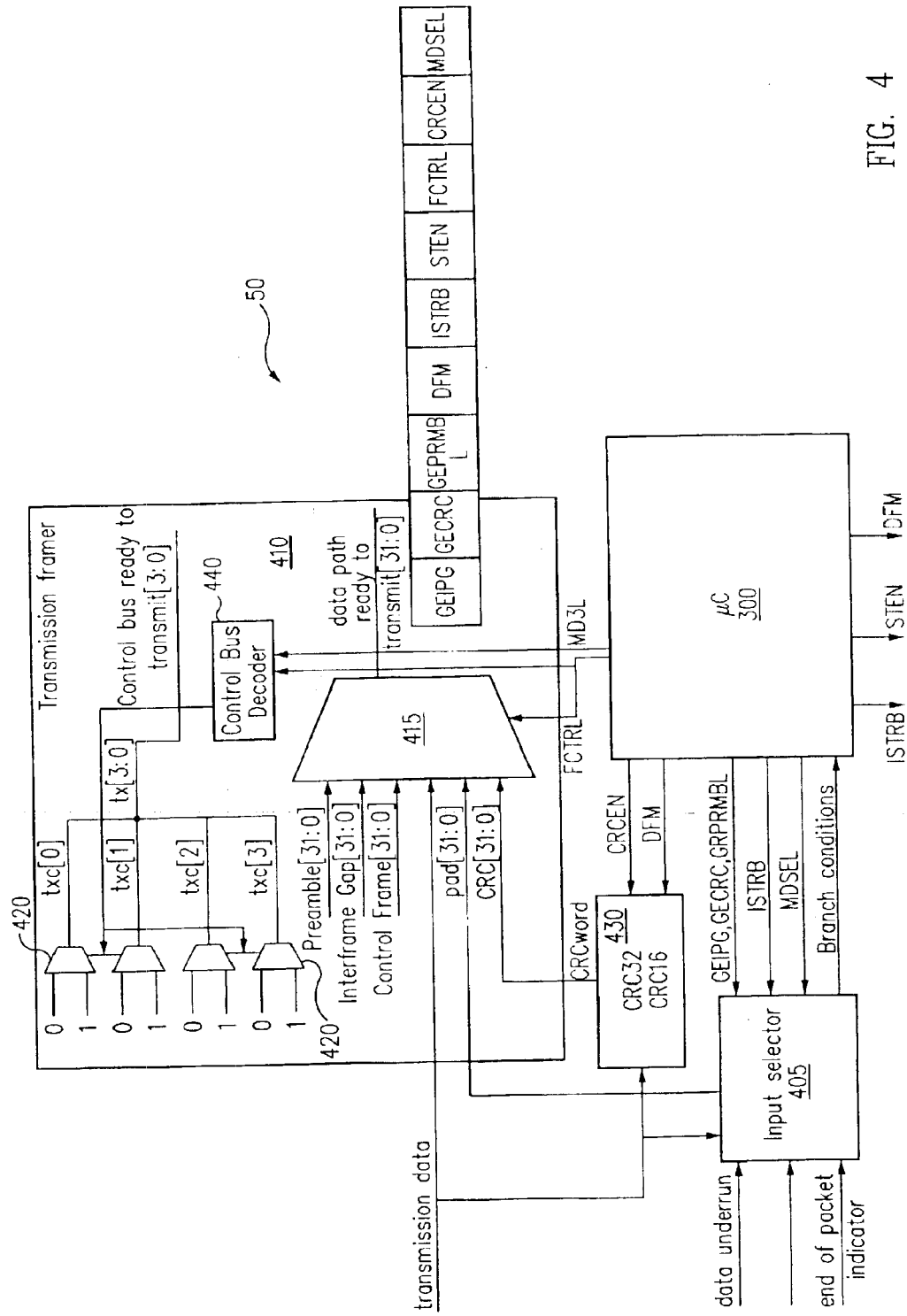
FIG. 4 is a block diagram of the transmitter co-processor in the MAC processor of FIG. 1.

Referring now to FIG. 4, a block diagram for transmitter co-processor 50 is shown. Transmitter co-processor 50 includes an input selector 405 that receives data underrun, start of packet, transmission data, and end of packet indications from the network layer in core fabric 20 of FPGA 30 (FIG. 1). Input selector 405 processes these inputs and generates the appropriate conditions for micro-controller's 300 condition select multiplexer 315 (FIG. 3). A transmission framer 410 includes a data selection multiplexer 415 and control word de-multiplexers 420 controlled by a control bus decoder 440. To provide a datapath word for transmission, data selection multiplexer 415 selects from transmission data, a padding word, a CRC word, an interframe gap word, and a preamble word. In response to the transmission data and a CRCEN field and a DFM field from the currently executed transmission control word 210a (described further below), a CRC co-processor 430 provides the CRC word (frame check sequence) to data selection multiplexer 415.

Micro-controller 300 controls transmitter co-processor 50 through the transmission control word 210a field of its currently-executed micro-instruction 200. Transmission control word 210a may have the following fields:

Framer Control Signal (FCTRL) controls the selection by data selection multiplexer 415 and control bus decoder 440.

CRC enable (CRCEN) marks which words in the transmission data should be used to calculate the frame check sequence (FCS) field.

ISTRB is asserted when transmitter co-processor 50 is in the idle state.

Discard Frame (DFM) is asserted to indicate a packet to be discarded in a "cut throat" operation.

Statistics Enable (STEN) is active when a statistics vector is valid.

Gigabit Ethernet Inter Packet Gap (GEIPG) state marker is active during a gigabit Ethernet packet transmission when the microstate corresponds to an inter packet gap insertion.

Gigabit Ethernet CRC (GECRC) state marker is active during a gigabit Ethernet packet transmission when the microstate corresponds to a CRC insertion.

Gigabit Ethernet Preamble (GEPRMBL) state marker is active during a gigabit Ethernet packet transmission when the microstate corresponds to a packet insertion.

Mode Select field (MDSL) indicates whether 1GE, 10GE, or PCIE operation is enabled.

Input selector 405 receives the GEIPG, GECRC, ISTRB, MDSEL, GEPRMBL, and DFM fields to assist in the determination of the appropriate input conditions for micro-controller 300. The ISTRB and STEN fields are directed to external devices as is known in the art.

Figure 5:
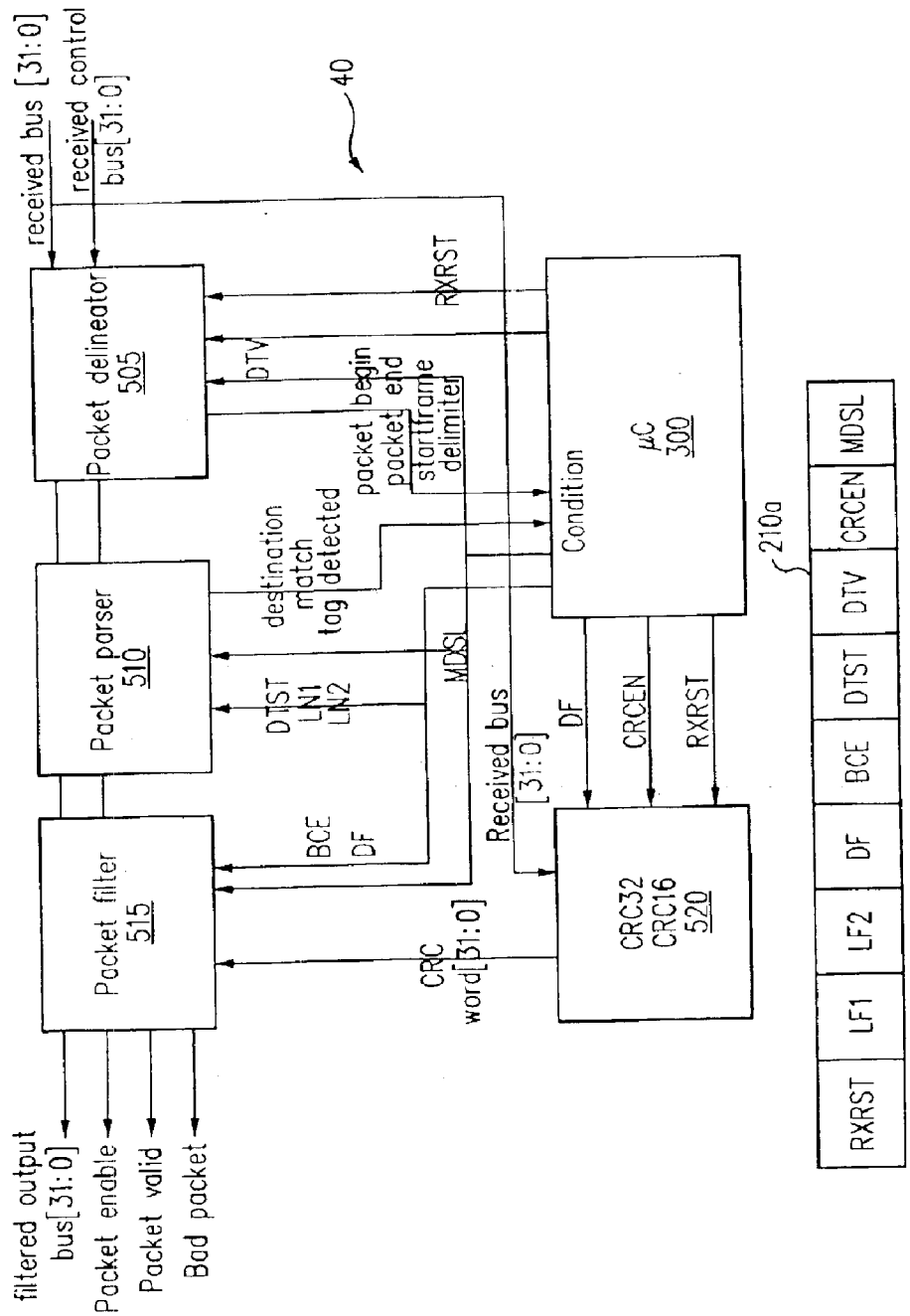
FIG. 5 is a block diagram of the receiver co-processor in the MAC processor of FIG. 1.

Turning now to FIG. 5, a block diagram for receiver co-processor 40 is shown. A packet delineator 505 receives the packet data and associated control words from the PCS layer 35 (FIG. 1) and probes for the beginning and end of a packet. After finding the beginning and end of a packet, it signals this as a condition to its micro-controller 300. In response, micro-controller 300 will awaken from its sleep state. A packet parser 510, responsive to control by micro-controller 300, analyzes the content of a received packet and reports the results back as conditions destination match and tag detected to micro-controller 300 so that the appropriate micro-instruction 200 may be executed. Should CRC be enabled, a CRC co-processor 520 receives the data packet from the PCS sublayer 35 and generates a CRC word/field check sequence. A packet filter 515 compares the generated CRC to the received FCS field. In addition, packet filter 515 discards any padding inserted into the received packet. Packet filter provides a filtered output data bus, packet enable signal, packet valid signal, and a bad packet signal to the network layer in the FPGA core 20 (FIG. 1).

Receiver micro-controller 300 controls receiver co-processor 40 through the receiver control word 210b field of its executed micro-instructions 200. Suitable fields in receiver control word 210b include:

CRC Enable (CRCEN) enables CRC calculation by CRC co-processor 520.

Data Valid (DTV) is used to strobe to external devices that the data is valid as is known in the art.

DTST signals to packet parser 510 that the last byte of the destination field in an Ethernet packet is expected.

Byte Count Enable (BCE) enables the count of bytes in each packet and is used by packet filter 515 to remove padding bits.

Discard Frame (DF) is set by receive micro-controller 300 whenever an anomalous packet reception occurs so that the packet may be discarded by packet filter 515. All states in receive micro-controller 300 are reset when DF is asserted.

Length Field 1 (LF1) indicates to packet parser 510 that a first byte of the length field for an Ethernet packet is expected.

Length Field 2 (LF2) indicates to packet parser 510 that a second byte of the length field for an Ethernet packet is expected.

Mode Select field (MDSL) indicates whether 1GE, 10GE, or PCIE operation is enabled.

Receiver synchronous reset (RXRST) is active after a successful reception of packet has occurred.

Consider the advantages of using a micro-controller to implement receiver and transmitter finite state machines for MAC layer processing. Should a user desire to change the communication protocol being supported, a new microprogram is loaded into each memory 305. For example, consider the following program to load the micro-program for a transmitter micro-controller 300 for 10 Gigabit Ethernet operation:

```
                    /* wait for packet */
        pc= IDLE_STATE;
            up[pc] = xge_wait_pckt(pc, up[pc]);
        pc +=1;
        /* data framing section */
        up[pc] = xge_prmbl(pc, up[pc]);
        pc +=1;
        up[pc] = xge_prmbl_sfd(pc, up[pc]);
        pc +=1;
        up[pc] = xge_pld(pc, up[pc]);
        pc +=1;
        up[pc] = xge_crc(pc, up[pc]);
        pc +=1;
        up[pc] = xge_ipg1(pc, up[pc]);
        pc +=1;
        up[pc] = xge_ipg2(pc, up[pc]);
        pc +=1;
        pc = ERR_VCTR;
        up[pc] = xge_err(pc, up[pc]);
        pc +=1;
        up[pc] = xge_err_01(pc, up[pc]);
        pc +=1;
        printf("MZ instruction set compiled \n");
        print_table (up, 128, dump);
```

Each micro-instruction corresponds to a framer state. For example, the function "xge_pld" returns the micro-instruction for an XGE payload state. Its structure looks like the following:

```
mic_ins* xge_pld(int pc, struct mic_ins *strtx)
{
strtx->istpc              = pc;
strtx->bpc                = NO;
strtx->jbs                = BRN;
strtx->.nas               = JMP;
strtx->.plrt              = INV;        /* if cond not true loop */
strtx->.cne               = ENB;
strtx->.bcs               = COND_2;     /* cop AND pad */
strtx->.brad              = pc;
strtx->.hw_brad           = ERR_VCTR;
strtx->mac_ctrl.frmr_stt  = XGE_PLD;
strtx->mac_ctrl.fifo_read = TRUE;
strtx->mac_ctrl.sttc_en   = FALSE;
strtx->mac_ctrl.idl_strb  = FALSE;
strtx->mac_ctrl.dsrcd_pckt = FALSE;
strtx->mac_ctrl.dn_strb   = FALSE;
strtx->mac_ctrl.pckt_crc  = TRUE;
return strtx;
}
```

In this xge_pld function, "tx_ctrl_word" specifies the transmission control word 210a to control transmitter co-processor 50 behavior while type specifier determines the next micro-instruction 200.

Error routines may also be micro-programmed and written into a different memory location in memories 305 than those locations storing the main program executed during normal operation.

The above-described embodiments of the present invention are merely meant to be illustrative and not limiting. It will thus be obvious to those skilled in the art that various changes and modifications may be made without departing from this invention in its broader aspects. For example, the voltage tracking technique disclosed herein may be applied to control the voltage tracking of power busses on a printed circuit board. Accordingly, the appended claims encompass all such changes and modifications as fall within the true spirit and scope of this invention.

What is claimed is:

1. A media access control (MAC) processor, comprising:
a receiver configured to generate conditions based upon a received data packet and a received control word from a physical layer source; the receiver including:
a micro-controller having a memory storing micro-instructions; the micro-controller being configured to execute a micro-instruction from the memory according to both the conditions and a previously-executed micro-instruction, the receiver being configured to, responsive to the micro-instruction being executed, generate an output for a network layer based upon the received data packet and the received control word.

2. The MAC processor of claim 1, wherein the receiver is integrated into a programmable logic device, the programmable logic device being configured to load the stored micro-instructions into the micro-controller's memory.

3. The MAC processor of claim 1, wherein each micro-instruction includes control fields and instruction fields, and wherein the micro-controller is configured to execute the micro-instruction according to the instruction field in the previously-executed micro-instruction, and wherein the receiver is configured to, responsive to the control field in the micro-instruction being executed, generate the output for the network layer based upon the received data packet and the received control word.

4. The MAC processor of claim 3, wherein the receiver is integrated into a programmable logic device and wherein the received data packet and control word from the physical layer source are organized according to a protocol selected from a group of possible communication protocols, the programmable logic device being configured to load the stored micro-instructions into the micro-controller's memory depending upon what communication protocol is selected.

5. The MAC processor of claim 4, wherein the control fields include a mode select field to indicate which communication protocol is selected.

6. The MAC processor of claim 4, wherein the group of possible communication protocols includes one Gigabit Ethernet, ten Gigabit Ethernet, and PCI Express.

7. The MAC processor of claim 1, wherein the receiver further comprises:
a CRC co-processor operable to generate CRC words based upon the received data packet.

8. The MAC processor of claim 7, wherein the control fields in the retrieved micro-instruction includes an enable signal for the CRC co-processor.

9. The MAC processor of claim 1, wherein the receiver further comprises:
a packet delineator operable to determine the a packet begin and a packet end signal based upon the received data packet, wherein the conditions generated by the receiver include the packet begin and packet end signals.

10. The MAC processor of claim 1, wherein the micro-controller receives a clock signal and is configured to cyclically execute a micro-instruction responsive to cycles of the clock signal such that at a given cycle of the clock, the micro-controller executes a micro-instruction according to the conditions and the micro-instruction executed in the previous clock cycle.

11. A media access control (MAC) sublayer processor, comprising:

a transmitter configured to generate conditions based upon a received data packet from a network layer source; the transmitter including:

a micro-controller having a memory storing micro-instructions, the micro-controller being configured to execute a micro-instruction from the memory responsive both to the conditions and a previously-executed micro-instruction, the transmitter being configured to, responsive to the micro-instruction being executed, generate a framed data packet and an associated control word for a physical layer subcoding processor based upon the received data packet.

12. The MAC processor of claim 11, wherein the transmitter is integrated into a programmable logic device, the programmable logic device being configured to load the stored micro-instructions into the micro-controller's memory.

13. The MAC processor of claim 10, wherein the transmitter is integrated into a programmable logic device and wherein the received data packet from the network layer source is organized according to a protocol selected from a group of possible communication protocols, the programmable logic device being configured to load the stored micro-instructions into the micro-controller's memory depending upon what communication protocol is selected.

14. The MAC processor of claim 11, wherein each micro-instruction includes control fields and instruction fields, and wherein the micro-controller is configured to execute the micro-instruction according to the instruction field in the previously-executed micro-instruction, and wherein the transmitter is configured to, responsive to the control field in the micro-instruction being executed, generate the framed data packet and the associated control word for the physical layer subcoding processor based upon the received data packet.

15. The MAC processor of claim 14, wherein the control fields include a mode select field to indicate which communication protocol is selected.

16. The MAC processor of claim 14, wherein the group of possible communication protocols includes one Gigabit Ethernet, ten Gigabit Ethernet, and PCI Express.

17. The MAC processor of claim 11, wherein the transmitter further comprises:

a CRC co-processor operable to generate CRC words based upon the received data packet.

18. The MAC processor of claim 11, wherein the micro-controller receives a clock signal and is configured to cyclically execute a micro-instruction responsive to cycles of the clock signal such that at a given cycle of the clock, the micro-controller executes a micro-instruction according to the conditions and the micro-instruction executed in the previous clock cycle.

19. A method of MAC sublayer processing, comprising:

providing a micro-controller configured to control the MAC sublayer processing of network layer data packets according to executed micro-instructions retrieved from a micro-program memory;

selecting a communication protocol from a set of potential communication protocols for the network layer data packets;

loading a set of micro-instructions into micro-program memory, wherein the set of micro-instructions are chosen according to the selected communication protocol; and executing the loaded micro-instructions to MAC sublayer process the network layer data packets according to the selected communication protocol.

20. The method of claim 19, wherein the set of potential communication protocols includes one Gigabit Ethernet, ten Gigabit Ethernet, and PCI Express.

21. A method of MAC sublayer processing, comprising:

providing a micro-controller configured to control the MAC sublayer processing of physical layer subcoding (PCS) data packets according to executed micro-instructions retrieved from a micro-program memory;

selecting a communication protocol from a set of potential communication protocols for the PCS data packets;

loading a set of micro-instructions into micro-program memory, wherein the set of micro-instructions are chosen according to the selected communication protocol; and executing the loaded micro-instructions to MAC sublayer process the PCS data packets according to the selected communication protocol.

22. The method of claim 21, wherein the set of potential communication protocols includes one Gigabit Ethernet, ten Gigabit Ethernet, and PCI Express.

23. A programmable logic device (PLD) comprising:

a programmable core fabric a serializer/deserializer (SERDES) circuit; and a media access control (MAC) processor integrated into the PLD between the core fabric and SERDES circuit, the MAC processor including a memory storing instructions representing the MAC sublayer of a communication protocol represented by instructions stored in the memory, the MAC processor thereby operable to process data passing between the SERDES circuit and the core fabric in accordance with the communication protocol.

24. The PLD of claim 23, wherein the MAC processor receives a clock signal and is configured to cyclically execute an instruction responsive to cycles of the clock signal such that at a given cycle of the clock, the micro-controller executes an instruction according to the instruction executed in the previous clock cycle.

* * * * *

UNITED STATES PATENT AND TRADEMARK OFFICE
CERTIFICATE OF CORRECTION

PATENT NO. : 6,879,598 B2
DATED : April 12, 2005
INVENTOR(S) : Zancan et al.

It is certified that error appears in the above-identified patent and that said Letters Patent is hereby corrected as shown below:

Column 8,
Line 61, "determine the a packet" should read -- determine a packet --.

Signed and Sealed this

Twelfth Day of July, 2005

JON W. DUDAS
*Director of the United States Patent and Trademark Office*